United States Patent

[11] 3,583,565

[72] Inventor Raymond C. Fischer
 Hinsdale, Ill.
[22] Filed Dec. 4, 1969
 Division of Ser. No. 710,284, Mar. 4, 1968,
 Pat. No. 3,528,564
[45] Patented June 8, 1971
[73] Assignee International Harvester Company
 Chicago, Ill.

[54] WEIGHT-RESPONSIVE BALE CONVEYOR
 1 Claim, 7 Drawing Figs.
[52] U.S. Cl. .................................................. 209/121
[51] Int. Cl. .................................................. B07c 5/20
[50] Field of Search ...................................... 209/121, 73

[56] References Cited
 UNITED STATES PATENTS
 1,141,048  7/1970  Fazackerley .................. 209/121
 1,916,552  7/1933  Beach .......................... 209/121
 2,169,897  8/1939  Lueckel ....................... 209/121

Primary Examiner—Allen N. Knowles
Attorney—Noel G. Artman

ABSTRACT: A bale wagon adapted for use in combination with a baler and having three platforms cooperatively arranged for (1) receiving bales discharged from the baler, (2) accumulating and rearranging the bales to form a horizontal layer, and (3) accumulating a series of layers to form a load of bales. The bale wagon includes a bale pusher assembly which may be selectively actuated to form a layer having bales arranged in an interlocked relation with bales of an adjacent layer.

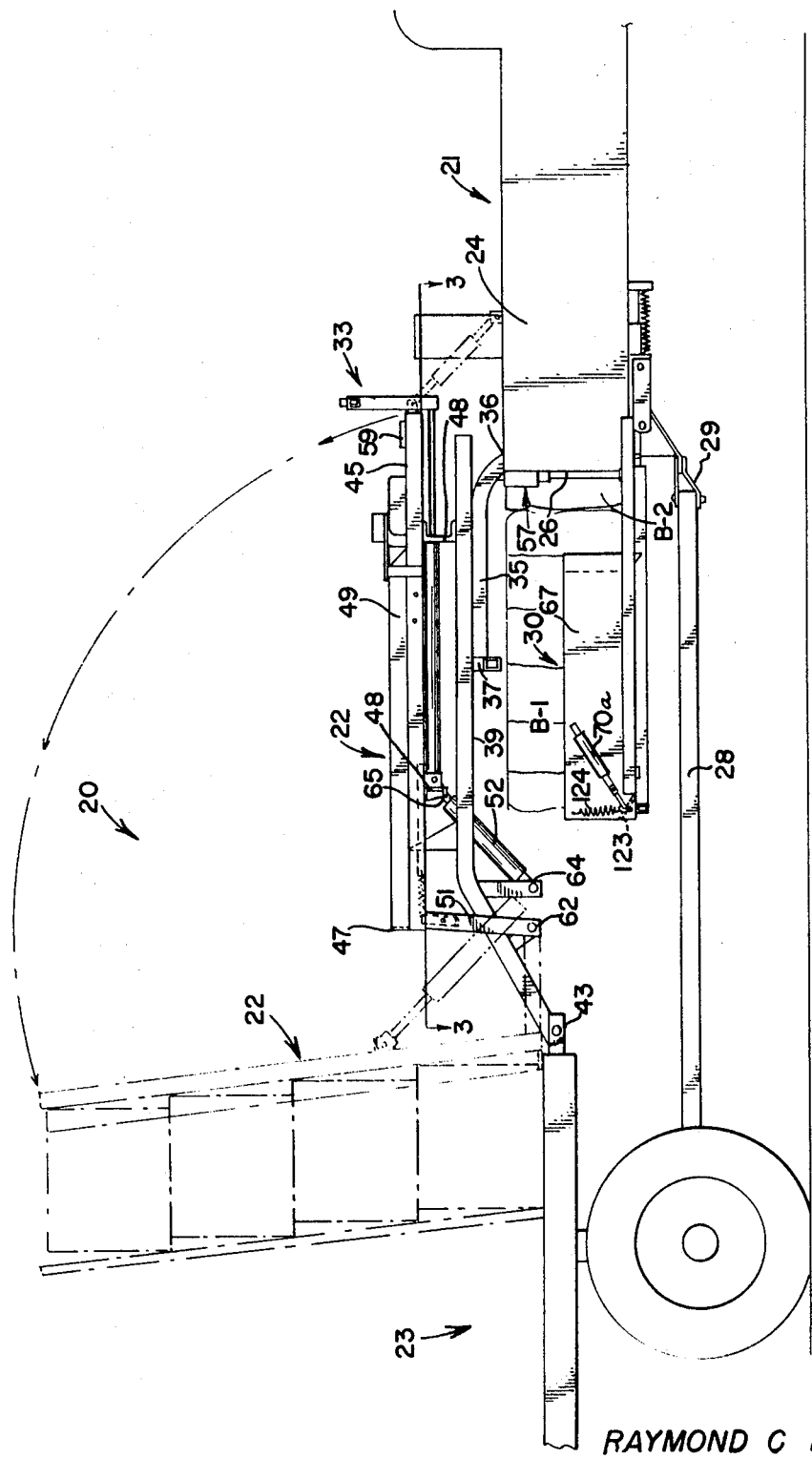

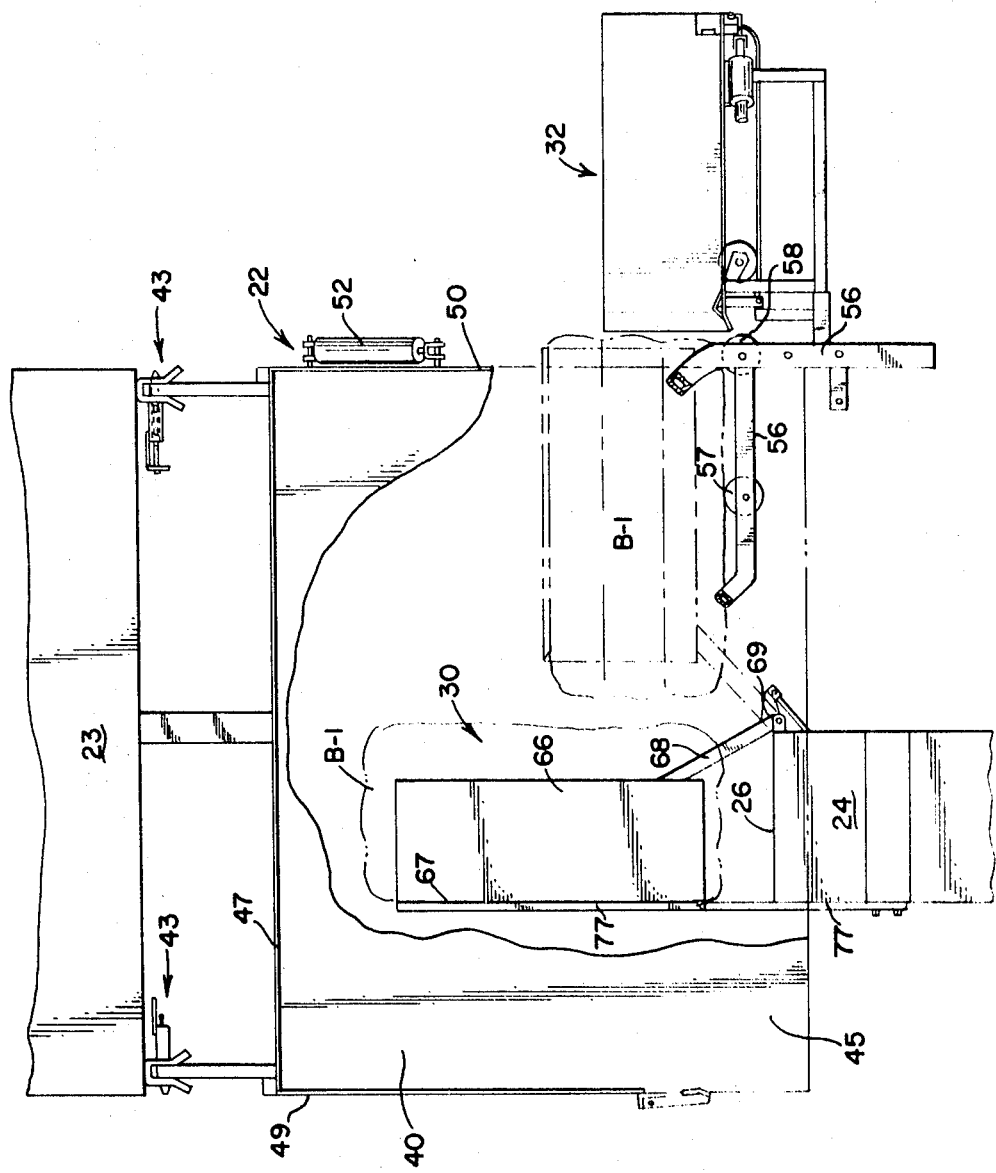

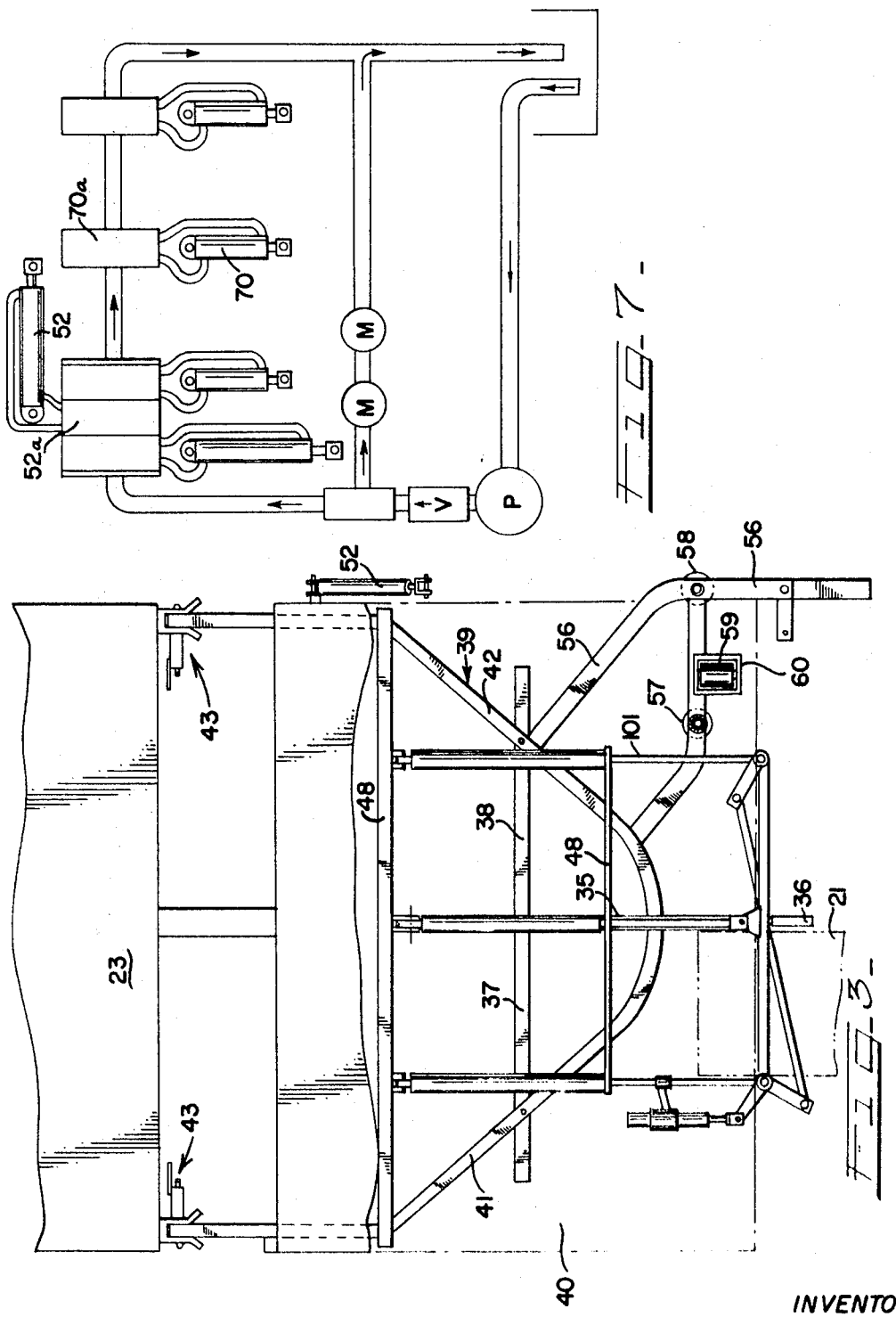

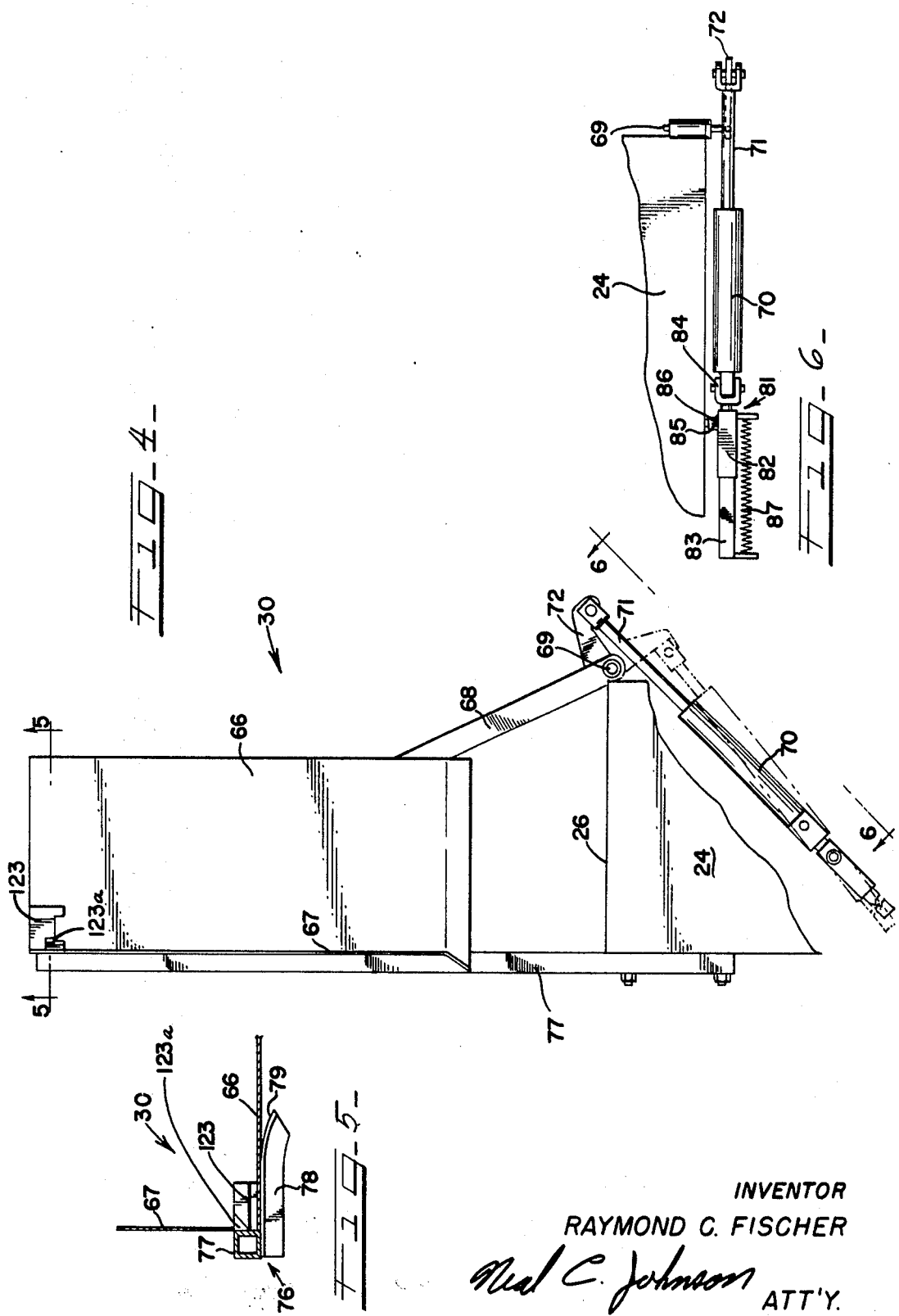

WEIGHT-RESPONSIVE BALE CONVEYOR

CROSS REFERENCE TO RELATED APPLICATIONS

This application is a division of U.S. application Ser. No. 710,284 filed Mar. 4, 1968, now U.S. Pat. No. 3,528,564.

BACKGROUND AND SUMMARY OF THE INVENTION

The present invention in general relates to the bale-handling art and more specifically to a bale wagon adapted to cooperate with a baler for mechanically accumulating bales discharged from the baler.

The combination of a baler and a bale wagon produces a unit capable of performing two separate and distinct hay-handling functions: form the bale and accumulate the bales. The accumulation function contemplates that the bales are ground deposited at the delivery point. This requires that the bale wagon be equipped with mechanical means for stacking bales to form a compact load and be sufficiently mobile to haul the load long distances.

The present invention provides for a bale wagon having a transport unit detachable from its associated loading facilities which are mounted on the baler. In addition to producing a highly maneuverable transport unit, this particular arrangement permits continuous baling operation by alternating two transport units with one baler and its loading facility attachment.

The loading facilities comprise a table permanently mounted on the baler and connection means for joining the transport unit therewith. Bale transfer means receives and delivers bales individually to the table which accumulates the bales into a layer according to a predetermined pattern. The pattern may be varied so that the final ground-deposited stack comprising a series of layers is constructed with the bales crosstied with each other. The cross-tieing arrangement, because of the interlocking relationship of the individual bales, produces a highly stable stack.

The table, while supported by the baler, is cooperably arranged with the transport unit and is operable to deliver each completed layer thereto. Upon accumulating a load of bales the transport unit is disconnected from the loading facilities and driven under separate power to the storage area. An alternate transport unit may then be connected to the baler attachment so that the baling and accumulation operation may be continued during the transport of the first load.

An object of this invention is to provide a bale wagon cooperable with a baler to mechanically accumulate a load of bales.

A further object is to provide an attachment for a baler, the attachment being capable of accumulating a layer of bales.

These and other objects of this invention will become apparent to those skilled in the art from the following disclosure taken in connection with the accompanying drawings.

DRAWINGS

FIG. 1 is a side elevational view of the bale wagon shown connected at the rear of a conventional baler;

FIG. 2 is a plan view of the layer-forming table with portions cut away for convenience of illustration;

FIG. 3 is a sectional view of the layer-forming table taken generally along line 3–3 of FIG. 1;

FIG. 4 illustrates the bale transfer platform and its associated hydraulic cylinder;

FIG. 5 is a sectional view of the bale transfer platform and taken generally along line 5–5 of FIG. 4;

FIG. 6 is a fragmentary view of a rear portion of the baler illustrating the manner in which the transfer cylinder is secured to the baler; and FIG. 7 is a diagrammatic presentation of the hydraulic system used to operate the various components of the bale wagon.

DESCRIPTION OF THE PREFERRED EMBODIMENT

With reference to FIGS. 1 and 2, a bale wagon 20 is seen cooperatively arranged with a conventional baler 21 which includes a bale chamber 24 having a rearwardly facing bale discharge 26. The bale wagon 20 includes two distinct but interrelated components—a layer-forming table 22 and a wheel-mounted transport unit 23. The table 22 is positioned in relation to the bale discharge 26 to receive bales individually delivered by transfer means which includes a bale-receiving platform 30, and an elevation platform 32. A bale pusher assembly 33 mounted on the table 22 operates to rearrange bales thereon to form a horizontal layer. With a completed layer, the table 22 is then pivoted to a generally vertical position wherein the horizontal layer is deposited on the transport unit 23 in the form of a vertical tier.

A wagon tongue 28 having its forward end pinned to a clevis 29 attached to the baler 21 provides the means for towing the transport unit 23 behind the baler. Power may be supplied by either the baler itself or by a tractor used to tow the baler. After a load of bales has been accumulated, the transport unit 23 is disconnected from the table 22 and the baler 21, and towed to the central storage area. Thus, the table 22 may be considered either as a component of the mechanically operated bale wagon 20 or as an attachment for the baler 21. The components of the bale wagon 20 will be described under the following functional headings: Layer-forming table 22, receiving platform 30, and controls.

Layer-Forming Table 22 FIGS. 1, 2, and 3)

A T-shaped member 35 has an upright portion 36 bolted to the bale chamber 24 and presents a pair of laterally extending and axially aligned arms 37 and 38. The member 35 provides the support for the table 22 which includes a frame 39 and a rectangular platform 40. The frame 39 is in the form of a U having a pair of rearwardly diverging legs 41 and 42. The ends of the legs 41 and 42 are pinned to the transport unit 23 by means of spring-loaded connectors shown generally at 43, 43. The legs 41 and 42 respectively, rest on arms 37 and 38 so that upon angular movement of the baler 21 with respect to the transport unit 23, the frame 39 and the overlaying platform 40 slide laterally along the supporting arms 37 and 38. This feature is particularly important for it permits the transport unit 23 to be a separate machine towed behind the baler 21. Without the feature providing a table movable laterally relative to the baler, the components would have to be combined in an integral machine which, because of its length, would present maneuverability problems.

Secured to the platform 40 and extending laterally thereacross are a pair of spaced channel members 48,48. The platform 40, lies generally in a horizontal plane, the elevation of which is above the top of the baling chamber 24. A front portion 45 of the platform 40 is situated directly above the bale chamber discharge 26.

Lateral guide members 49 and 50 flank the platform 40 and a rear guide member 47 interconnects the guide members 49 and 50 enclosing the platform 40 on three sides.

Appended to leg 42 of frame 39 and extending laterally outwardly therefrom is a structure 56 from which depends a pair of roller assemblies 57 and 58. The rollers 57 and 58 are journaled to the structure 56 for rotation about a vertical axis and extend downwardly below the top of the bale chamber discharge 26. As will be described in detail below, the rollers 57 and 58 cooperate with the receiving platform 30 to transfer a bale to the elevating platform 32. The structure 56 also supports a third roller 59 which is rotatably mounted in a bracket 60 for rotation about a horizontal axis. The roller 59 is disposed above the structure 56 and has a peripheral portion projecting through a slot formed in the platform 40. Rollers 57, 58, and 59 are continuously driven by conventional means (not shown) which may comprise a hydraulic motor and belt drive.

As best seen in FIG. 1, the table 22 is supported at its rearwardmost end by a pair of uprights 51. The uprights 51,51 have their upper ends welded or otherwise securely affixed to the rear corners of the platform 40, and their lower ends pinned to the frame 39 as shown at 62. A hydraulic cylinder 52 anchored to the frame 39 as at 64 and having a piston rod 65 connected to the platform 40, provides the means for tilting the platform 40 about the axis defined by the pin connection 62. The cylinder 52 is actuable to move the platform 40 from an essentially horizontal position to an essentially vertical position wherein the rearward edge defined by guide 47 of the platform 40 is situated adjacent the receiving bed of the transport unit 23.

Receiving Platform 30 FIGS. 2, 4, 5, and 6)

The receiving platform 30 performs the dual function of receiving a bale discharged from the bale chamber 24 and moving it laterally to a position for delivery to the elevating platform 32. The receiving platform 30 is L-shaped in cross section having a horizontal plate member 66 and an upright wall 67. With the platform 30 in the bale-receiving position, the horizontal member 66 is disposed opposite the bale chamber discharge 26, and the upright wall 67 represents a continuation of the left wall of the bale chamber 24 as viewed in FIG. 2.

The receiving platform 30 is mounted on one end of an arm 68 which is hingedly connected to the bale chamber as shown generally at 69. A hydraulic cylinder 70 secured to the underside of the bale chamber 24 has a piston rod 71 connected to a pivot arm 72 integrally formed with arm 68. (See FIGS. 4 and 6).

Retraction of the piston rod 71 pivots the platform 30 about the hinged connection 69 from the bale-receiving position (solid-line position of FIG. 2) to a bale delivery position (broken-line position of FIG. 2).

As illustrated in FIG. 4, the width of the member 66 is slightly less than that of a bale emerging from the bale chamber 24; hence, the overhanging upright portion of a bale carried by the platform 30 abuts the rollers 57 and 58 at spaced points with the platform 30 in the bale delivery position.

It should be noted that the platform 30 is spaced from the bale chamber discharge 26 and that the hinge point 69 is offset from the longitudinal axis of the bale chamber 24. Thus, angular movement of the platform is initially rearward and lateral with respect to the bale chamber discharge 26, thereby precluding interference from a succeeding bale emerging from the bale chamber 24.

In the home, bale receiving position, the receiving platform 30 rests on a support 76 which includes a square tube 77 and a guide 78. The forward end of the tube 77 is bolted to the bale chamber 24 and extends rearwardly therefrom terminating at the rearward extremity of the platform 30. The guide 78 secured to the tube 77 projects laterally therefrom and is disposed in an underlying relation to the member 66. The tube 77 is positioned adjacent the platform 30 and serves to properly orient the platform 30 upon returning to its home position. To facilitate the return of the platform 30, the guide has a downturned portion 79.

In order that a bale carried by the receiving platform 30 be properly aligned with the rollers 57 and 58, the cylinder 70 is secured to the underside of the bale chamber 24 by means of an assembly 81 which automatically compensates for misalignment of the baler 21 and the table 22. As illustrated in FIG. 6, the assembly 81 comprises a sleeve 82 and a rod 83 slidably mounted in the sleeve 82. The sleeve 82 and rod 83 are complementary formed in the shape of square square so that angular alignment is maintained at all times. Affixed to the sleeve 82 is a collar 85 which is mounted on a pin 86 depending from the underside of the bale chamber 24.

The rod 83 projects on either side of the sleeve and carries at one end a bracket 84 to which is pinned the hydraulic cylinder 70. The bracket 84 is urged against the sleeve 82 by means of a compression spring 87. Now, when hydraulic flow is directed to the rod end of a cylinder 70, the piston rod 71 retracts until a bale carried by the platform 30 engages the rollers 57 and 58. Further flow to the cylinder 70 moves the cylinder 70 along the rod 71 compressing the spring 87. Thus, it will be appreciated that the platform 30 may be pivoted through a wide range because of the overriding effect of the assembly 81. Furthermore, the assembly maintains a positive force on the bale to insure constant frictional engagement between the bale and the rollers 57 and 58. The continuously rotating rollers 57 and 58 transfers the bale from the receiving platform 30 onto the aligned elevating platform 32.

The elevating platform 32 is disposed outside the lateral extend of the table 22 and functions to receive bales from the receiving platform 30, to elevate the bales to the height of the table 22, and to discharge the elevated bales thereon.

CONTROL

The hydraulic control system is shown schematically in FIG. 7 wherein the operative relationship between the cylinders 52 and 70 and the respective control valves 52a and 70a will be seen.

The directional valve 70a actuating the receiving platform cylinder 70 is mounted on the upright wall 67 and is actuably connected to a pedal 123 which is pivotally mounted on platform 30 and disposed in the path of the bale as it emerges from the bale chamber 24 onto the platform 30. (see FIG. 1). As the bale engages the lever 123, the weight of the bale overcomes the resistance of spring 124 shifting the directional valve 70a, directing hydraulic flow to the cylinder 70. This causes the piston rod 71 to be retracted which in turn pivots the platform 30 to the bale delivery position. Now, as the bale is transferred from the platform 30 to the elevating platform 32, it clears the lever 123 allowing a bias spring 124 to shift the spool in valve 70a beyond its neutral position. This reverses flow to the cylinder 70 causing the platform 30 to return to its home position. Slant surface 123a depresses lever 123, which recenters valve 70a.

The spring-biased pedal 123 provides the additional function of automatically rejected untied bales which would adversely effect the stability of the final ground-deposited stack. The spring force of spring 124 is selected so as to yield under the force of a bound bale resting on the pedal 123, but not to yield under the force of an individual hay charge or vertical segment which makes up the bale (see FIG. 1). Thus, it will be understood that an untied bale will be forced rearwardly over the tilted pedal 123 by a succeeding bale emerging from the bale chamber 24 and discharged onto the ground.

OPERATION

With the transport unit 23 connected to the layer-forming table 22 and the baler 21 and with the platforms 30, 32, and 40 in their respective home positions, the baler-bale wagon combination is towed through the wind-rowed field. As shown in FIG. 1, bales of hay are forced through the bale chamber discharge 26 onto the receiving platform 30. As the bale B-1 is pushed clear of the bale chamber 24 by a succeeding bale B-2, the front edge of the emerging bale trips pedal 123 which shifts the spool valve 70a directing hydraulic flow to the pivot cylinder 70. The platform 30 is pivoted to the bale delivery position of FIG. 2 wherein the leading longitudinal side of the bale B-1 carried thereby engages the rollers 57 and 58. The continuously rotating rollers 57 and 58 transfer the bale B-1 onto the aligned elevating platform 32. As the bale B-1 clears the platform 30, the spring-loaded pedal 123 returns beyond its normal position shifting the spool valve 70a. This reverses hydraulic flow to the pivot cylinder 70 causing the platform 30 to return to the home position, which recenters valve 70a.

As described above, if the bale on the pedal 123 is incompletely formed as a result of being improperly tied, the weight will be insufficient to overcome the force of the spring 124. Accordingly, the valve 70a will not be shifted and the cylinder 70 will not be actuated. Thus, the platform 30 remains in the position shown in solid lines in FIG. 2 whereupon the unbound bale will be forced off the end of the platform 30 by a succeeding bale emerging from the bale chamber 24.

When the bales emerging from the bale chamber 24 are properly tied so as to be of proper weight, the same are transferred into a layer on the platform 40. After a layer is completed which may be determined by a conventional rachet counter, the directional valve 52a may be manually actuated to direct fluid to the hydraulic cylinder 52 which extends the piston rod 65 moving the platform 40 to its suspended position. This deposits the layer on the bed of transport unit 23.

Although this preferred embodiment has been described in particular detail, it should be emphasized that modifications and alterations may be made therein without departing from the scope and spirit of the invention as set forth in the appended claims.

What I claim is:

1. An apparatus for automatically conveying bound bales and rejecting unbound bales, said bales consisting of a plurality of separate vertical segments, said apparatus comprising:

a bale-receiving platform;

a bale source adapted to deposit a bale on said bale-receiving platform;

bale transfer means for moving said bale away from said bale-receiving platform;

control means for detecting the presence of a bound bale received on said bale-receiving platform, said control means including means for supporting a portion of said bale, means for sensing the weight of said supported portion, and means for actuating said bale transfer means in response to a predetermined weight being such that a bound bale is moved away from said receiving platform and an unbound bale remains on said receiving platform; and means for removing said unbound bale from said receiving platform, said means for supporting a portion of said bale including a lever movably mounted on said platform and adapted to engagingly support a frontal portion of a bale deposited on said platform, said means for sensing the weight of said supported portion including biasing means operatively connected to said lever to oppose pivotal movement of said lever in response to weight supported thereon, said biasing means being yieldable at a predetermined support weight, and said means for actuating said bale transfer means including means operatively responsive to movement of said lever.